United States Patent [19]

Ellis-Brown

[11] Patent Number: 4,887,524

[45] Date of Patent: Dec. 19, 1989

[54] SHRIMP COOKING APPARATUS

[75] Inventor: Roy Ellis-Brown, Maitland, Fla.

[73] Assignee: International Seafood Engineering, Inc., Miami, Fla.

[21] Appl. No.: 182,301

[22] Filed: Apr. 11, 1988

[51] Int. Cl.[4] .......... A23L 3/00

[52] U.S. Cl. .......... 99/443 C; 99/467; 99/341; 99/404; 99/470; 426/523

[58] Field of Search .......... 99/443 C, 342, 467, 99/450, 443 R, 330, 326, 331, 367, 341, 410, 403, 417, 404, 470; 126/20, 369; 426/523, 510, 511

[56] References Cited

U.S. PATENT DOCUMENTS

| | | | |
|---|---|---|---|
| 979,591 | 12/1910 | Storm | 99/443 C |
| 2,355,798 | 8/1944 | Guthier | 99/443 C |
| 2,880,522 | 4/1959 | Rollins | 99/443 C |
| 3,718,082 | 2/1973 | Lipoma | 99/443 C X |
| 3,908,533 | 9/1975 | Fagerstrom | 99/443 C X |
| 3,961,569 | 6/1976 | Kenyon | 99/443 C X |
| 4,004,129 | 1/1977 | Hicks | 99/443 C X |
| 4,368,664 | 1/1983 | Smith | 99/386 |
| 4,417,507 | 11/1983 | Shotwell | 99/443 C X |
| 4,473,004 | 9/1984 | Wells | 99/443 C X |
| 4,582,047 | 4/1986 | Williams | 99/443 C X |
| 4,644,857 | 2/1987 | Buller-Colthurst | 99/443 C X |

FOREIGN PATENT DOCUMENTS

| | | | |
|---|---|---|---|
| 736724 | of 1932 | France | 99/443 C |

*Primary Examiner*—Philip R. Coe
*Assistant Examiner*—K. O'Leary
*Attorney, Agent, or Firm*—William M. Hobby, III

[57] ABSTRACT

A shrimp cooking apparatus has a frame having a motor driven endless belt conveyor with a porous endless belt supported to the frame. A housing covers a portion of the porous endless belt and is supported on the frame and has an entrance thereinto and an exit therefrom. A steam pipe is connected to a source of steam at one end thereof and to a plurality of steam manifolds connected beneath the surface of the porous endless conveyor belt. Each of the manifolds has a plurality of openings therein to release steam directly under the porous endless belt to thereby apply heat and pressure to the shrimp on the endless belt in the housing. A solenoid valve is connected to each steam manifold to control the release of steam from the manifold and sensors are placed in the housing for sensing heat in the housing. Cool water is sprayed on the shrimp leaving the housing to stop the cooking of the shrimp more precisely and sensing means are used to sense the heat in the housing so that the shrimp can be cooked to a predetermined degree. An alternate embodiment is made for shipboard use having a plurality of porous endless belts, one dumping onto the other, and a separate conveyor for lifting the shrimp onto the top conveyor belt.

6 Claims, 2 Drawing Sheets

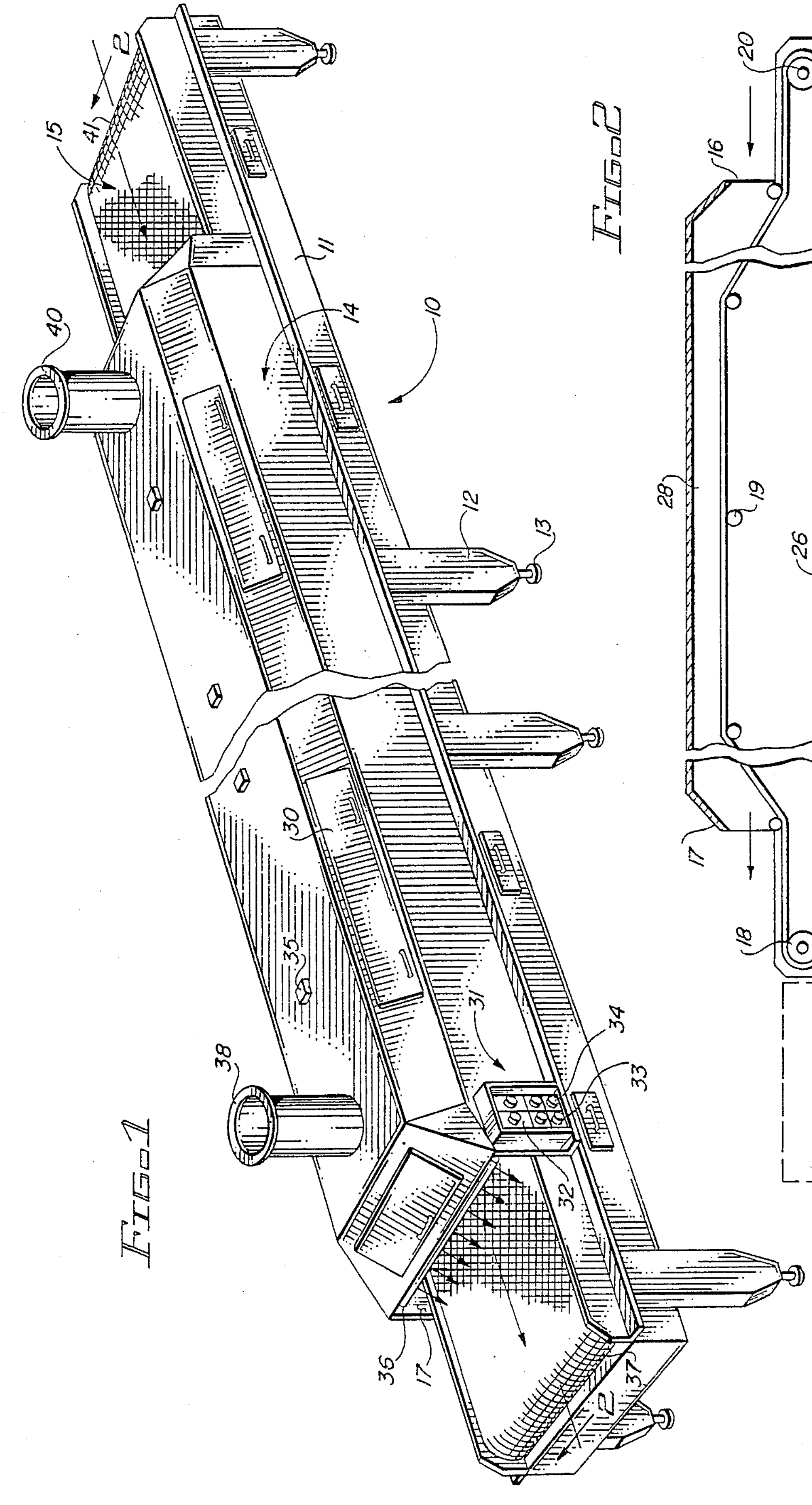
FIG-1
FIG-2
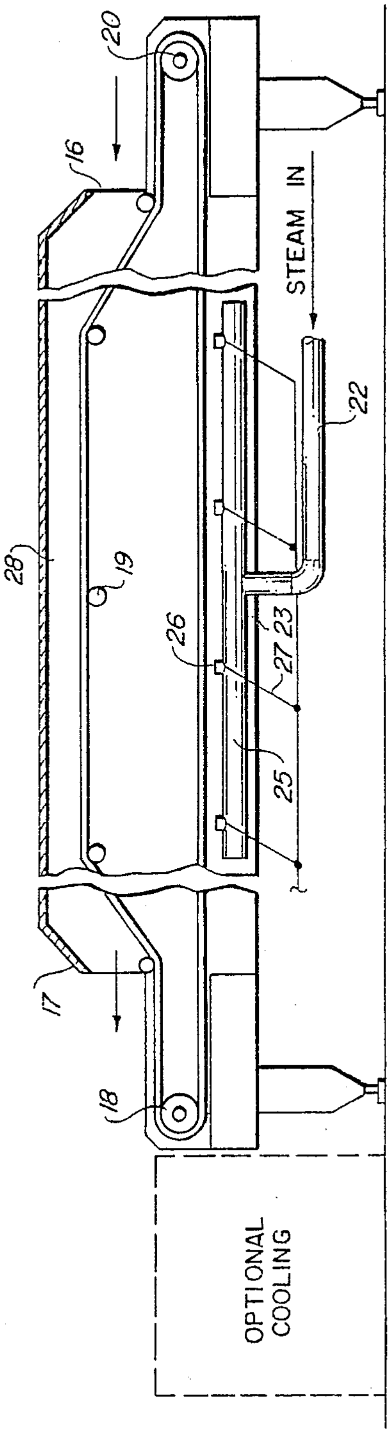

SHRIMP COOKING APPARATUS

BACKGROUND OF THE INVENTION

The present invention relates to a cooking method and apparatus, in particular, to such methods and apparatus which are specifically designed to cook shrimp.

In the past, a wide variety of cooking systems have been provided from simple pots to complex automated cooking ovens. Ovens having continuous conveyor belts have been provided in the past but these typically cook bakery products, and the like, and have electric or gas heating elements for baking cookies, bread, or the like, on the conveyor belt being fed through the continuous oven. This type of oven has a continuous flow of air at atmospheric pressure and is typically heated with electrical heat so that there is no build up of pressure as would be desirable in cooking seafood.

Shrimp are prepared utilizing a wide variety of prior art cooking methods and devices. In commercial cooking methods, however, it is generally customary to heat the shrimp with steam while applying pressure from an external source. See for example U.S. Pat. No. 3,501,317, to Veltman. In other methods such as the Hice U.S. Pat. No. 3,672,908, pressure from an external source is also applied prior to as well as during the heating of the shrimp.

An object of all shrimp cooking processes is to avoid the weight loss during the heating step. As explained by Veltman, the cooking of shrimp in water, or aqueous solutions often causes a weight loss of between 30–50 percent resulting in a higher cost per pound of cooked shrimp.

Another object in any cooking process is to destroy or remove the bacteria present in the "green" shrimp. Although acceptable for commercial purposes, many, if not most commercial shrimp cooking processes cannot remove bacteria below a 250,000 per gram plate count.

SUMMARY OF THE INVENTION

The present invention relates to a shrimp cooking apparatus comprising a steel frame having a motor driven endless belt conveyor having a stainless steel porous endless belt supported on the frame. A housing covering a portion of the porous endless belt is supported on the frame and has an entrance thereinto and an exit therefrom. A steam feed pipe is connected to a source of steam at one end and to a plurality of steam manifolds extending beneath the surface of the porous endless belt. Each manifold has a plurality of openings therein to release steam directly under the porous endless conveyor belt so that shrimp on the endless belt have steam applied through the belt to the shrimp to heat the shrimp while increasing the pressure within the housing so that shrimp on the endless belt have heat and pressure applied thereto by the release of steam thereunder.

A solenoid valve is connected to each steam manifold to control the release of steam from the manifold, remotely, and cooling water is sprayed on the shrimp and conveyor belt as the shrimp exit from the housing to stop the cooking of the shrimp. Sensors, such as thermistors, are placed in the housing for sensing the heat in the housing to provide a feedback signal for controlling the cooking of the shrimp by the release of a predetermined amount of steam through the solenoid valves connected to the manifolds. A central control box controls the release of steam as well as the speed of the conveyor belt.

An alternate embodiment has a plurality of endless porous conveyor belts positioned on top of the other so that one drops the shrimp to the next with each conveyor belt being simultaneously driven by one motor. A food lift lifts the shrimp and dumps them onto the first conveyor belt, while the last conveyor belt dumps the shrimp onto an exit chute where they are sprayed with cold water. The steam manifold is placed beneath the bottom endless conveyor belt, while the thermistor sensor is placed above the top endless conveyor belt.

BRIEF DESCRIPTION OF THE DRAWINGS

Other objects, features and advantages of the present invention will be apparent from the written description and the drawings in which:

FIG. 1 is a perspective view of a shrimp cooking apparatus in accordance with the present invention;

FIG. 2 is a sectional view taken on line 2—2 of FIG. 1 and showing the electrical connections for the individual solenoids;

DESCRIPTION OF THE PREFERRED EMBODIMENT

Figure 4:
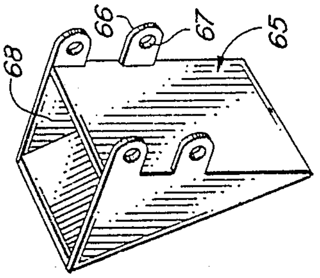
FIG. 4 is a perspective view of a lift cup taken on the circle 4 of FIG. 3.

The state of the art in shrimp cooking has proved it is essential to cook under a pressurized environment in order to achieve maximum meat yield. However, there is no criteria which describes the absolute range of pressure required to obtain the maximum of yield. Current pressurized cookers operate at approximately 25–50 PSI which pressure is obtained by external pressure pumps. This invention eliminates the need for external pressure devices, and instead derives its required pressure of approximately one atmosphere above ambient by its own method.

Reference to FIG. 1 will show that the unit is a continuous moving belt system which is open at both the input and the output ends. Shrimp are fed to the belt and are carried inward and upward into a cooking area which is subjected to the heating by live steam because the steam is confined in this area and causes a pressure rise which is sufficient to provide the environment required for the prevention of cooking loss. Test results from several pounds of various species and sizes of shrimp have shown the efficiency of this device.

Yields of 100% have been obtained, along with the elimination of Salmonella. A plate count of bacteria in of the order of 12,000 per gram has been obtained. The taste, texture and color of the finished product is dramatically improved.

Referring to FIGS. 1 and 2 of the drawings, a shrimp cooking apparatus 10 has a framework 11 including a plurality of legs 12 with threaded adjustment pads 13. The frame may be made of stainless steel or steel and has a cooking housing 14 attached to the top thereof and a porous stainless steel conveyor belt 15 attached to the frame 11 and passing through the stainless steel housing 14 from the entrance 16 to the exit 17 of the housing 14. The entrance stainless steel porous conveyor belt 15 rides on a motor driven roller 18 on one end and on a idler roller 20 on the other end and has a plurality of idler rollers located therebetween with idler rollers 19 elevated to lift the product therein up into the housing 14. The rollers 18 and 20 are mounted to the frame 11 for supporting the endless conveyor belt 15. The endless conveyor belt is made of a porous stainless steel to allow steam to pass therethrough in the housing 14. A central steam pipe 22 is connected to a steam source at one end and into an elongated manifold 23 attached to the frame 11 and has individual manifolds 25 extending therefrom beneath the porous endless belt 15. Each manifold 25 has a solenoid 26 connected thereto having an electrical conductor 27 extending therefrom for remote control of the solenoid valve 26 to open and close the valve 26 and to vary the steam fed into each manifold 25. Each manifold 25 has a plurality of openings therein for releasing the steam directly under the belt 15.

Because the product is elevated by the belt 15 into the cooking zone, the steam is trapped and allows a build up of pressure in the zone to approximately one and one half atmospheres before it is allowed to escape via the open ends 16 and 17. This capability of creating a pressure zone in the center of an open ended chamber reduces the heat and time required to cook the product.

The housing 14 captures the steam in the chamber 28 under the housing to allow build up of pressure and heat in the chamber 28 caused by the release of steam from the manifolds 25. The pressure typically builds up to one and one half atmospheres even with the open ended housing. Panel doors 30 are located along the housing 14 to allow entrance into the housing as desired. A central control box 31 has each conductor 27 from each solenoid valve connected to each of four zone controls 32, each having a rheostat control to vary the position of the solenoid valves 26 to release steam individually from each zone control 32. Another rheostat control 33 can control the electric motor driving the belt 15 to vary the speed of the belt as the belt passes through the housing 14 and a master electrical switch 34 allows the entire apparatus to be shut down. A plurality of four thermistors 35 are placed in the housing 14 and connected to a central control box 31 to give the temperature pressure reading of four different zones in the housing 14, so that each rheostat control can be adjusted as desired to control the temperature pressure applied to the shrimp on the conveyor belt 15 as they pass through the housing 14. The thermistors 35 will then maintain the temperature of each zone as set within close tolerances.

A cold water spray discharge tube 36 is mounted adjacent the exit 17 and sprays cold water onto the conveyor belt 15 and shrimp to quickly cool the shrimp for precise control of the cooking of the shrimp as they pass on the conveyor belt. The shrimp are dumped off the end 37 of the conveyor belt 15 into containers. A pair of dampers 38 and 40 are located through the stainless steel housing 14 to control the release of steam and heat from the cooking housing 14. In operation, this system is turned on with the master switch 34 with the speed of the belt being adjusted with the control 33. The shrimp are placed on the conveyor belt 15 at the beginning end 41 and fed into the stainless steel housing 14. The steam from the four manifold pipes each with solenoid values 26 is dispersed therein directly beneath the porous stainless steel belt 15 and passes through the belt and by the shrimp to maintain an elevated pressure and temperature in the chamber 28 for cooking the shrimp. A plurality of sensors 35 sense the temperature and there may be thermistors to control the temperature of different zones along the cooking housing 14. The release of steam can be controlled in each zone by the zone controls 32 controlling through the conductors 27 and the solenoid actuated valves 26. The shrimp are precisely cooked depending upon their size and weight and the cooking is stopped by the spraying of cold water from the pipe 36 directly thereunto. The shrimp are dumped off the end 37 into a container for packaging.

Figure 3:
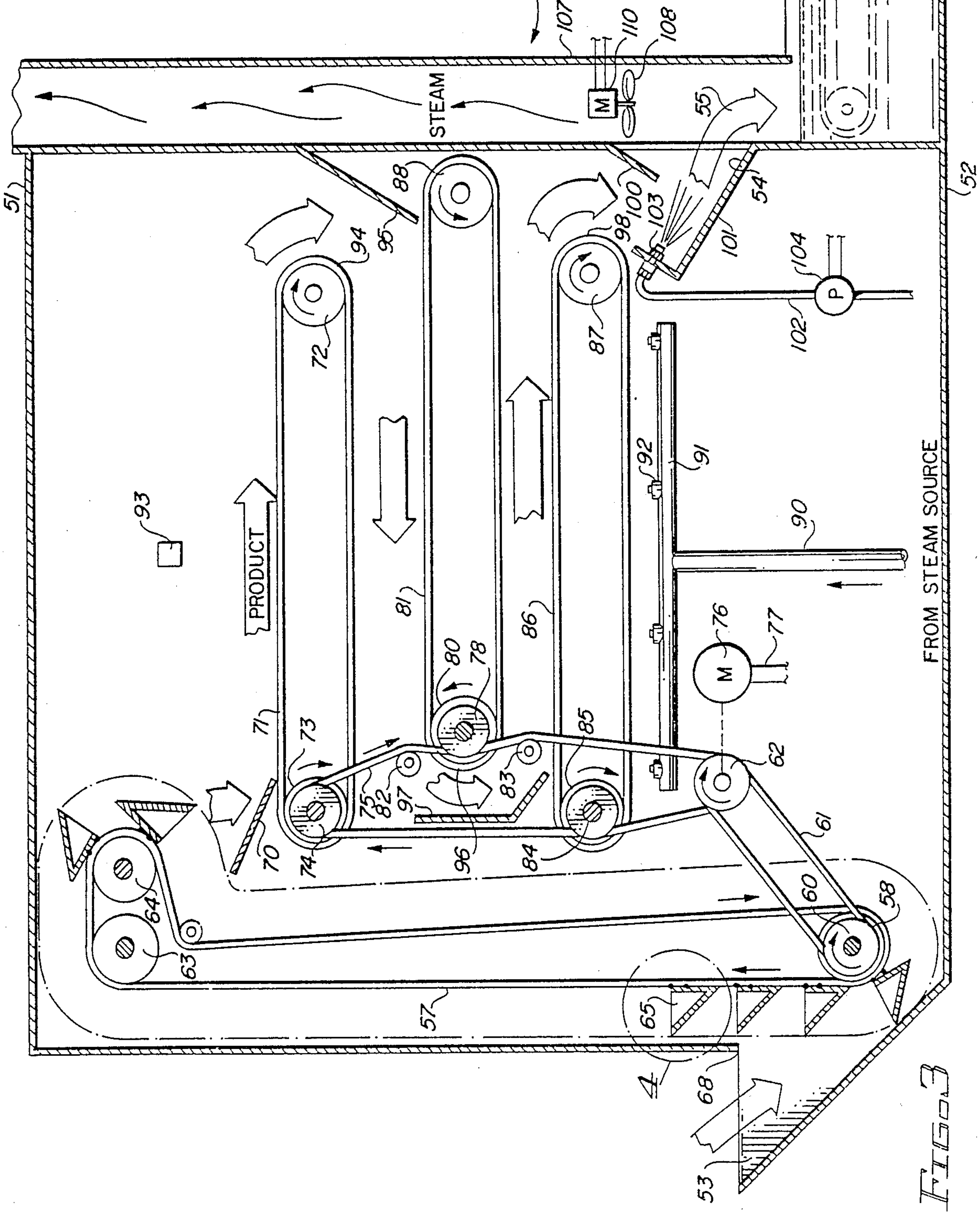
FIG. 3 is a sectional view of an alternate embodiment of the present invention.

Turning to FIGS. 3 and 4, a second embodiment is illustrated of a shipboard shrimp cooker 50 having a housing 51 supported on a base frame 52 and having an input chute 53 for feeding shrimp thereinto, and a discharge chute 54 for discharging shrimp through an opening 55 onto a conveyor belt 56. An elevator lift 57 is an endless belt connected around an idler roller 58 driven by a pulley 60 from a belt 61 connected to a motor drive pulley 62. The endless conveyor belt 57 is also continuously fed around idler rollers 63 and 64 in a continuous path. The belt 57 has a plurality of lift buckets 65 attached thereto. Each lift bucket is triangular in cross-sectional shape, as shown in FIG. 4 and has four brackets 66, each having an opening 67 therein for attaching to the endless belt 57, and having an enlarged opening 68 forming a scoop for lifting the shrimp dumped into the chute 5 and passing through an opening 68 and are lifted and dumped onto a chute 70 where they slide onto a first porous stainless steel conveyor belt 71 supported on an idler roller 72 and a powered roller 73 having a pulley 74 on one end thereof. The pulley 74 has a drive belt 75 extending therearound, driven from the pulley 62 which in turn is driven by an electric motor 76 powered from an electrical conductor 77. The drive belt 75 also passes by a pulley 78 connected to a roller 80 driving an endless conveyor belt 81 which also may be made of porous stainless steel interconnected links or mesh. The belt is supported against the pulley 78 by a pair of idler rollers 82 and 83. The belt 75 also is connected to a pulley 84 connected to a roller 85 driving an endless stainless steel porous conveyor belt 86. The belt 86 is supported on the roller 87 while the belt 81 is supported on the roller 88. A central steam pipe 90 feeds steam to a manifold 91 having a plurality of solenoid controlled valves 92 attached thereto for feeding steam directly beneath each of the porous conveyor belts 86, 81 and 71, which thus feeds the steam directly through all of the conveyor belts and thereby all of the shrimp in each of three tiers and in addition builds up steam pressure to around one and one half atmosphere in the housing 51 to apply heat and pressure to the shrimp as they pass therethrough. A thermistor 93 may be mounted in the housing 51 above the belt 71 to maintain a temperature reading in the housing. The shrimp being lifted by the conveyor buckets 65 and dumped onto the chute 70 fall onto the conveyor belt 71 where they are directed off the end of the belt 94 and against a chute 95 connected to the housing 51. The shrimp then slide down the chute 95 onto the top of the conveyor belt 81 off the end of the conveyor belt 96 and against a chute 97 where they are directed onto the top of the conveyor belt 86. They are fed across the conveyor belt 86 off the end 98 against a chute surface 100 and onto a discharge chute 101. The discharge chute has a cold water pipe 102 having spray nozzles 103 which spray cold water onto the shrimp as they pass on the chute 101 responsive to the actuation of the pump 104 to cool the shrimp. The shrimp are discharged with the water out the opening 55 into a container 105 filled with cool water 106 onto the conveyor 56. The steam in the housing 51 is also fed out the opening 55 but rises up a discharge stack 107 where it is accelerated by a fan 108 motor driven by a motor 110.

Since shrimp boats tend to have a more limited space than might be available in a food plant, the housing 51 is made smaller but taller and has a series of conveyor belts dropping from one to the other to conserve space and a lift conveyor belt 57 to raise the shrimp in buckets to drop them onto the top conveyor belt. One steam manifold system can direct steam through all of the belts and maintain the increased pressure and heat in the entire housing 51 with escaping steam escaping out of a stack 107 out of the same opening as the escaping shrimp sliding down the chute 101 into the container 105.

It should be clear at this point that a shrimp cooking system has been provided which allows a precise control of the cooking of shrimp and allows for adjustment for the size of the shrimp by adjustments to the speed of the conveyor belts and the length of time of cooking the shrimp, as well as control of the heat and pressure. The cooking is precisely stopped by spraying the cooked shrimp with cold water to cool them rapidly. The embodiment in FIGS. 3 and 4 have a control system as shown in FIGS. 1 and 2, to electrically control the speed of the motor 76 as well as the discharge from the solenoid valves 92 while maintaining a continuous reading of the desired temperature and pressure from the sensor 93.

However, the present invention is not to be construed as limited to the forms shown which are to be considered illustrative rather than restrictive.

I claim:

1. A shrimp cooking apparatus comprising:

a frame;

a motor driven endless belt conveyor having a porous endless belt supported on the frame;

a housing covering a portion of the porous belt and supporting on said frame, said housing having an entrance thereinto and an exit therefrom;

a steam feed pipe connected to a source of steam at on end thereof;

steam manifold means connected to said steam feed pipe and extending beneath the surface of the porous endless belt, said steam manifold means having a plurality of openings therein to release steam under said porous endless belt, whereby shrimp on said endless belt have heat and pressure applied thereto by the release of steam thereunder;

a plurality of solenoid valves connected to said steam manifold means to control the release of steam from said steam manifold means;

cooling means for cooling the shrimp exiting the housing to stop the cooking of the shrimp;

sensing means for sensing the heat in said housing whereby shrimp can be cooked to a predetermined degree; and said housing having a raised portion forming a raised chamber and said endless belt conveyor having a raised portion in said housing raised chamber to thereby lift shrimp in the housing into the raised chamber and to lower the shrimp to exit the housing, said endless conveyor belt raised portion extending substantially horizontal over a predetermined length in said raised chamber so as to maintain said shrimp in the raised chamber under elevated temperature and pressure for a predetermined length of time.

2. A shrimp cooker apparatus in accordance with claim 1 including a control center having a plurality of zoned rheostat controls, each connected to one of said plurality of steam manifold solenoid valves for controlling the release of steam thereby.

3. A shrimp cooking apparatus in accordance with claim 2 in which said control box includes a motor control for varying the speed of a motor driving said motor driven endless belt conveyor.

4. A shrimp cooking apparatus in accordance with claim 3 in which said motor drive endless belt conveyor is a stainless steel mesh belt.

5. A shrimp cooking apparatus in accordance with claim in which said sensing means includes a plurality of thermistors sensing the temperature at different zones in said housing.

6. A shrimp cooking apparatus in accordance with claim 5 in which said cooling means includes a spray nozzle spraying cold water onto said shrimp exiting said housing.

* * * * *